United States Patent
Bouten

(10) Patent No.: US 8,979,415 B2
(45) Date of Patent: *Mar. 17, 2015

(54) ADHESIVELY BONDED JOINT IN AGRICULTURAL BOOM STRUCTURE

(75) Inventor: Petrus Henricus Johannes Bouten, Jackson, MN (US)

(73) Assignee: AGCO Corporation, Duluth, GA (US)

( * ) Notice: Subject to any disclaimer, the term of this patent is extended or adjusted under 35 U.S.C. 154(b) by 147 days.

This patent is subject to a terminal disclaimer.

(21) Appl. No.: 13/457,594

(22) Filed: Apr. 27, 2012

(65) Prior Publication Data

US 2012/0275847 A1    Nov. 1, 2012

Related U.S. Application Data

(60) Provisional application No. 61/479,941, filed on Apr. 28, 2011.

(51) Int. Cl.
*F16B 11/00* (2006.01)
*A01M 7/00* (2006.01)

(52) U.S. Cl.
CPC .................................. *A01M 7/0071* (2013.01)
USPC ........... 403/267; 403/265; 403/341; 403/169; 239/159; 52/655.1

(58) Field of Classification Search
CPC   A01M 7/0071; A01M 7/0075; A01M 7/0078
USPC ......... 403/169, 170, 265, 266, 267, 268, 341, 403/171, 176, 172; 239/159, 160, 161, 163; 52/650.2, 653.2, 655.1
See application file for complete search history.

(56) References Cited

U.S. PATENT DOCUMENTS

| 1,662,768 | A | * | 3/1928 | Wait | 403/263 |
| 1,662,769 | A | * | 3/1928 | Wait | 403/171 |
| 2,709,975 | A | | 6/1955 | O'C.Parker | |
| 3,688,461 | A | * | 9/1972 | Rensch | 52/653.1 |
| 4,233,794 | A | * | 11/1980 | Mayer | 52/506.07 |
| 4,336,678 | A | * | 6/1982 | Peters | 52/837 |
| 4,881,603 | A | | 11/1989 | Hartman | |
| 5,039,129 | A | | 8/1991 | Balmer | |

(Continued)

FOREIGN PATENT DOCUMENTS

FR             2643831 A1      9/1990

OTHER PUBLICATIONS

International Search Report for PCT/US12/035389 dated Sep. 11, 2012.

*Primary Examiner* — Daniel P Stodola
*Assistant Examiner* — Matthew R McMahon

(57) ABSTRACT

An adhesively bonded joint in a boom arm of an agricultural sprayer has a tee-shaped brace member with a top flange and a stem extending from the top flange. A brace-receiving portion of the joint has a slot formed therein that receives the stem of the tee-shaped brace member. The sides of the stem and underside of the top flange are adhesively bonded to facing surfaces of the brace-receiving portion. The slot is formed with a v-shape, with the mouth of the slot being wider than the width of the distal end of the slot, to provide some flexibility in the angular positioning of the tee-shaped bracing member. The joint further includes a locking collar around an end of the tee-shaped brace. Opposite sides of the locking collar engage notches on either side of the slot to lock the stem of the tee-shaped brace member in the slot.

3 Claims, 6 Drawing Sheets

(56) References Cited

U.S. PATENT DOCUMENTS

| | | | |
|---|---|---|---|
| 5,228,259 A * | 7/1993 | Haddad et al. | 52/653.2 |
| 5,435,110 A * | 7/1995 | Stol et al. | 52/655.1 |
| 5,522,544 A | 6/1996 | Gal | |
| 5,716,155 A * | 2/1998 | Yoshida et al. | 403/187 |
| 6,032,431 A * | 3/2000 | Sugiyama | 52/656.9 |
| 6,148,565 A * | 11/2000 | Lancaster | 52/13 |
| 6,217,251 B1 * | 4/2001 | Kato et al. | 403/341 |
| 6,505,857 B2 * | 1/2003 | Fosse et al. | 280/779 |
| 6,554,225 B1 * | 4/2003 | Anast et al. | 244/117 R |
| 6,735,917 B1 * | 5/2004 | Notermann | 52/656.9 |
| 7,065,927 B2 * | 6/2006 | Powell et al. | 52/167.3 |
| 7,188,456 B2 * | 3/2007 | Knauseder | 52/592.1 |
| 7,445,400 B2 * | 11/2008 | Takeuchi | 403/292 |
| 7,992,358 B2 * | 8/2011 | Olofsson et al. | 52/582.1 |
| 8,122,669 B2 * | 2/2012 | Legnini et al. | 52/573.1 |
| 8,209,939 B2 * | 7/2012 | Anast et al. | 52/838 |
| 8,464,967 B2 * | 6/2013 | Kuphal et al. | 239/168 |
| 2009/0165419 A1 * | 7/2009 | Richard et al. | 52/650.2 |
| 2011/0158741 A1 * | 6/2011 | Knaebel | 403/265 |
| 2012/0273590 A1 * | 11/2012 | Honermann et al. | 239/159 |

\* cited by examiner

ADHESIVELY BONDED JOINT IN AGRICULTURAL BOOM STRUCTURE

CROSS REFERENCE TO RELATED APPLICATIONS

This application claims priority to U.S. Provisional Application No. 61/479,941 filed Apr. 28, 2011, entitled "ADHESIVELY BONDED JOINT IN AGRICULTURAL BOOM STRUCTURE".

BACKGROUND OF THE INVENTION

1. Field of Invention

This invention relates generally to a sprayer boom on a crop sprayer, and more particularly to structural joints joining members of the sprayer boom.

2. Description of Related Art

The high crop yields of modern agribusiness require application of fertilizers, pesticides, and herbicides. Dispersing these chemicals onto high acreage fields requires specialized machines mounted on or towed by a vehicle. An example of such a machine is the self-propelled crop sprayer.

A common design for a self-propelled crop sprayer includes a dedicated chassis with a tank, boom arms, and nozzles connected to the boom arms. The tank contains fluid such as fertilizers, pesticides, and herbicides. Boom arms extend outward from the sides of the dedicated chassis. Boom plumbing contains supply lines and a plurality of nozzles spaced apart along the length of the boom arms at a standard spacing distance which corresponds to the spray pattern of the nozzles. In operation, as the crop sprayer crosses the field, fluid is pumped from the tank through the supply lines along the boom arms, and out through the nozzles. This allows the self-propelled sprayer to distribute the fluid along a relatively wide path. The length of conventional boom arms may vary from, for example, 6 meters (18 feet) up to 46 meters (150 feet), but smaller or longer booms are possible. The boom arms typically swing in for transport and out for operation.

Conventionally, the boom arm has many beams, chords and braces and other structural members welded or bolted together to form a lattice structure. If the components are to be welded, the wall thickness and the choice of materials for the components can be limited. Additionally, the time to assemble and the manufacturing costs can be high.

Based on the foregoing, it would be desirable to provide a structure or especially joint structure that enhances functionality, durability, flexibility in material choice and simplifies assembly by use of adhesives.

OVERVIEW OF THE INVENTION

In one embodiment, the invention relates to an adhesively bonded joint in a boom arm of an agricultural sprayer. The joint includes a tee-shaped brace member having a top flange and a stem extending from the top flange. The joint also includes a brace-receiving portion of a structural member of the boom arm. The brace-receiving portion has a slot formed therein that receives the stem of the tee-shaped brace member. The sides of the stem and underside of the top flange are adhesively bonded to facing surfaces of the brace-receiving portion.

In one embodiment, the slot is formed with a v-shape, with the mouth of the slot being wider than the width of the distal end of the slot, to provide some flexibility in the angular positioning of the tee-shaped bracing member. The adhesively bonded joint further includes a locking collar around an end of the tee-shaped brace. Opposite sides of the locking collar engage notches on either side of the slot to lock the stem of the tee-shaped brace member in the slot.

These and other features and advantages of this invention are described in, or are apparent from, the following detailed description of various example embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DESCRIPTION OF EXAMPLE EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
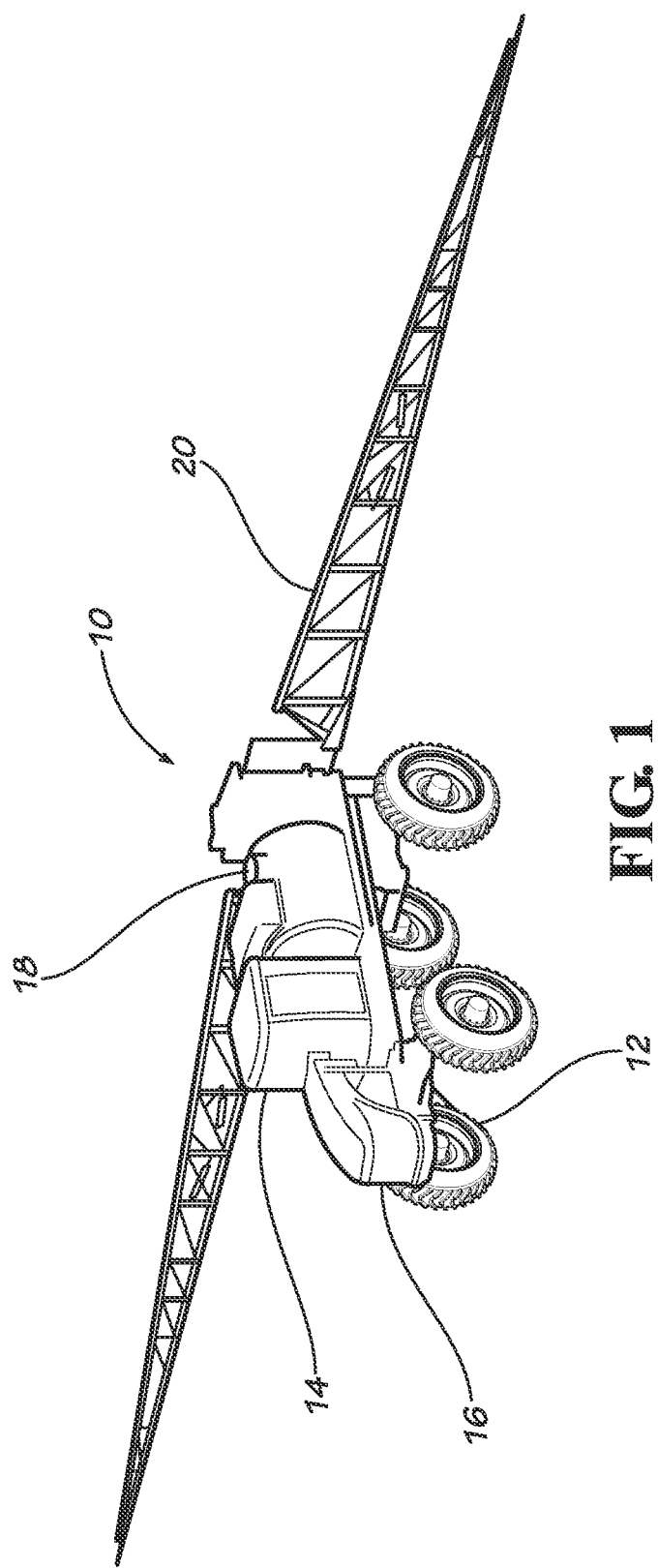
FIG. 1 is a perspective view of a crop sprayer.

FIG. 1 shows a crop sprayer 10 used to deliver chemicals to agricultural crops in a field. Crop sprayer 10 includes a chassis 12 and a cab 14 mounted on the chassis 12. Cab 14 may houses an operator and a number of controls for the crop sprayer 10. An engine 16 may be mounted on a forward portion of chassis 12 in front of cab 14 or may be mounted on a rearward portion of the chassis 12 behind the cab 14. The engine 16 may be commercially available from a variety of sources and may comprise, for example, a diesel engine or a gasoline powered internal combustion engine. The engine 16 provides energy to propel crop sprayer 10 and also may provide energy used to spray fluids from the crop sprayer 10.

The crop sprayer 10 further includes a storage tank 18 used to store a fluid to be sprayed on the field. The fluid may include chemicals, such as but not limited to, herbicides, pesticides, and/or fertilizers. Storage tank 18 may be mounted on chassis 12, either in front of or behind cab 14. Crop sprayer 10 may include more than one storage tank 18 to store different chemicals to be sprayed on the field. The stored chemicals may be dispersed by crop sprayer 10 one at a time or different chemicals may be mixed and dispersed together in a variety of mixtures.

Boom arms 20 extending from each side of the crop sprayer 10 are used to distribute the fluid from the tank 18 over a wide swath as the crop sprayer 10 is driven through the field. The fluid is conveyed by a fluid supply system and various spray nozzles (not shown) spaced along the boom arms 20. As is known in the art, a pump (not shown) pumps fluid from the tank 18 through the spray nozzles. An operator of the crop sprayer 10 may use controls (not shown) located in the cab 14 to control movement of the boom arm 20 and to turn on and to shut off the fluid flow to the plurality of spray nozzles. The boom arms 20 extending from either side of the crop sprayer 10 are desirably substantially identical but mirror images of each other, so only one boom arm 20 will be discussed herein.

Figure 2:
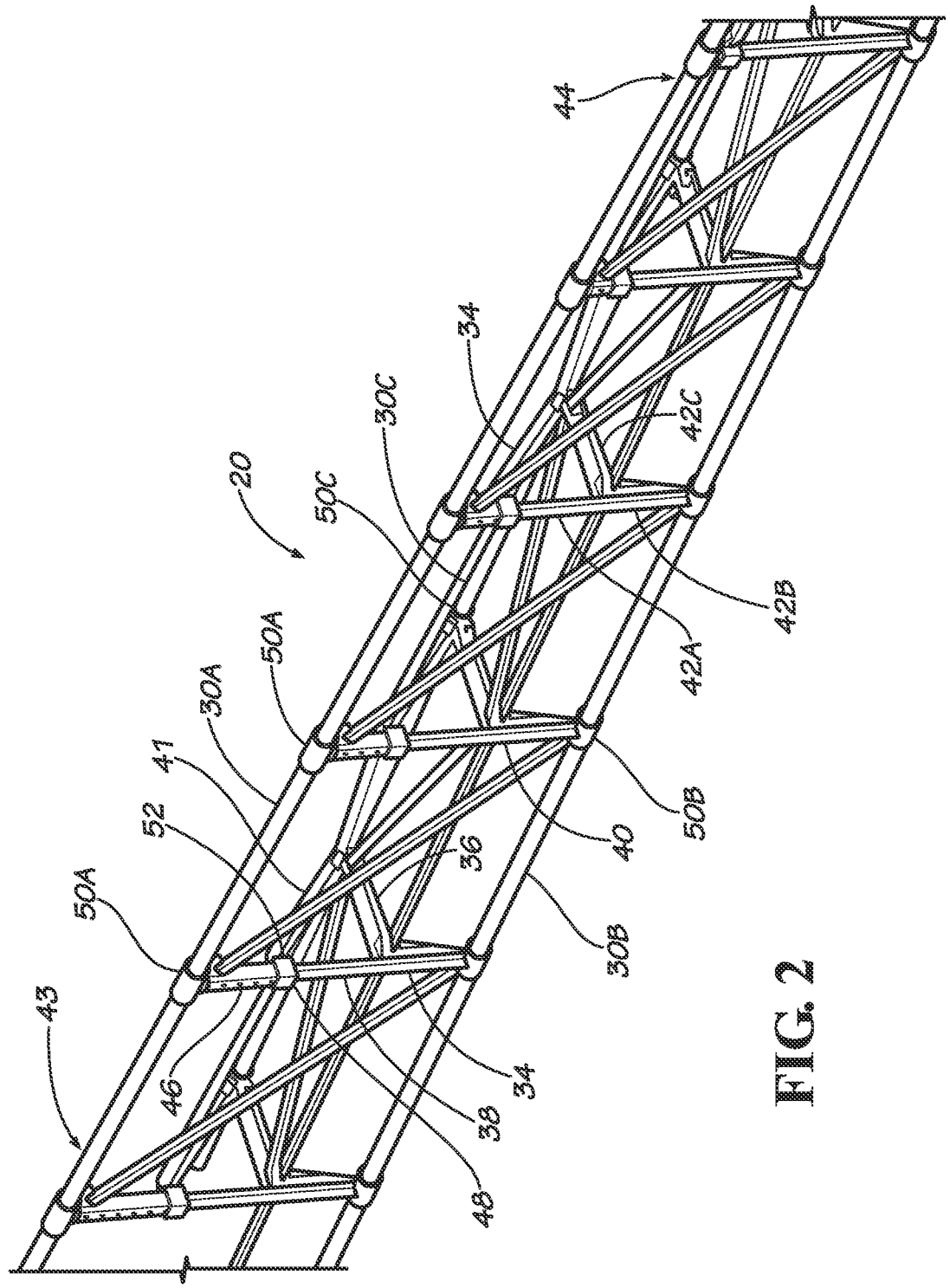
FIG. 2 is a perspective view of a portion of a boom arm on the crop sprayer of FIG. 1 according to an embodiment of the invention.

Turning to FIG. 2, the boom arm 20 is a truss structure having three chords 30A, 30B and 30C arranged in a triangular formation extending outward from the crop sprayer 10. At periodic intervals, cross-sectional frame members 34 connect the three chords 30A, 30B, 30C to provide structural integrity. Looking at the embodiment of the boom arm 20 from the frame of reference shown in FIG. 2, each cross-sectional frame member 34 includes a generally horizontal component 36 and a generally vertical component 38 meeting at a cross-sectional junction 40. In one example embodiment, the boom arm 20 is mounted on the crop sprayer 10 such that the horizontal and vertical components 36, 38 of the cross-sectional frame members 34 are generally horizontal and vertical with respect to the surface of the ground when the crop sprayer 10 is in use. However, one skilled in the art will understand that the boom arm 20 may be mounted on the crop sprayer 10 in other orientations such that the horizontal and vertical components 36, 38 are not respectively parallel and perpendicular with the general surface of the ground.

In the illustrated embodiment, each cross-sectional frame member 34 has three legs 42A, 42B, 42C extending from the interior junction 40. First leg 42A of cross-sectional frame member 34 extends toward chord 30A, second leg 42B extends toward chord 30B and third leg 42C extends toward chord 30C such that the three legs 42A, 42B, 42C of the cross-sectional frame member form a tee shape. In the tee-shaped embodiment illustrated in FIG. 2, the frame member 34 desirably has one or more diagonals 41 connecting two of the legs, such as the end of leg 42A with the end of leg 42C as in the illustrated embodiment. In another embodiment of the cross-sectional frame member 34, the three legs 42A, 42B and 42C are arranged in a triangular formation with the three chords 30A, 30B and 30C connecting at or near the corners of the triangular formation. Cross-sectional frame members 34 may be formed from two or more castings or welded parts or may be of one piece constructions. Differing requirements for size of boom arm 20 may be met by selecting the size and shape of cross-sectional frame members 34 using sound engineering judgment.

In the example embodiment illustrated in FIG. 2, the boom arm 20 has a tapered shape such that the distance between chord 30A and chords 30B and 30C decreases along the boom arm 20 from its proximal end 43 closest the chassis 12 of the crop sprayer 10 out toward its distal end 44. Each cross-sectional frame member 34 is configured to receive an extension member 46 that extends between a distal end 48 of leg 42A and a connector 50A mounted on chord 30A. As can be seen in FIG. 2, the length of extension member 46 depends on the location of the cross-sectional frame member 34 on the boom arm 20. Extension members 46 are longer on the inner portions of the boom arm 20 closest to the chassis 12 of the crop sprayer 10 and decrease in length out towards the distal end 44 of the boom arm 20 as the boom arm 20 tapers. Thus, cross-sectional frame member 34 at the distal end 44 of the boom arm 20 may have a short extension member 46 or may not have an extension member 46 at all. In the illustrated embodiment, each extension member 46 is a generally rectangular beam received in a pocket 52 at the distal end 48 of leg 42A. However, one skilled in the art will understand that extension member 46 may have any other shape that is suitable to provide the requisite strength, such as U-shaped, H-shaped or I-shaped, and may connect with the end of leg 42A by any means using sound engineering judgment. In this example embodiment, the tapered boom arm 20 is made with cross-sectional frame members 34 having a uniform design and the taper of the boom arm 20 is accounted for using extension members 46 extending from leg 42A having progressively shorter lengths. Of course, one skilled in the art will understand that boom arm 20 may be constructed without a tapered shape such that cross-sectional frame members 34 and extension members 46, if any, are identical throughout the boom arm 20.

Figure 3:
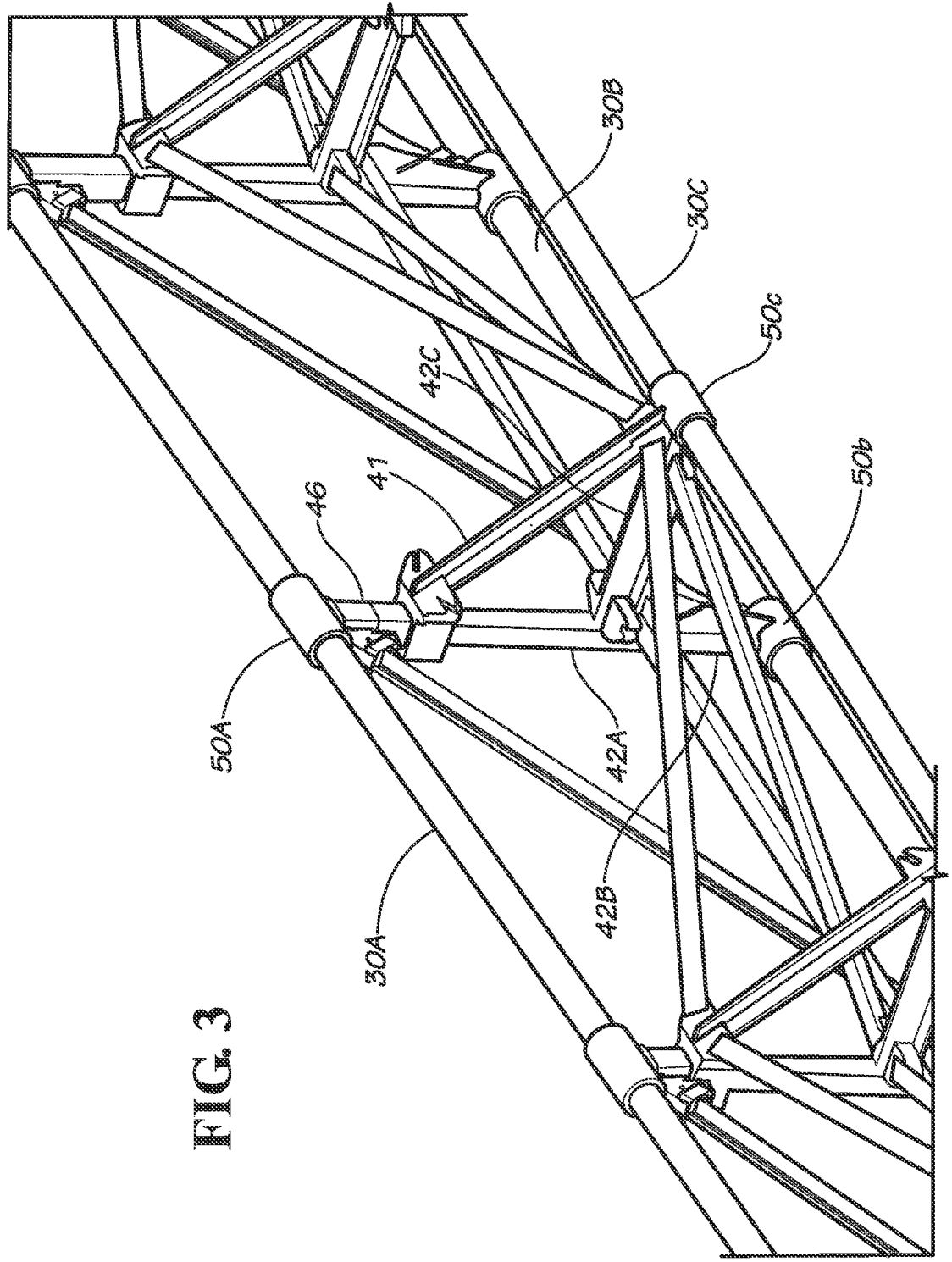
FIG. 3 is an enlarged perspective view of a portion of the boom arm of FIG. 2.

Joints of the boom arm 20 have connectors 50A, 50B, 50C that connect the cross-sectional frame member 34 to chords 30A, 30B, 30C. In one embodiment as best seen in FIG. 3, connectors 50B and 50C are integral with the legs 42B, 42C respectively of the cross-sectional frame member 34 and desirably formed by casting. Alternately, connectors 50B and 50C may be fastened to the end of legs 42B and 42C, respectively, of the cross-sectional frame members 34 with any means using sound engineering judgment. In the illustrated embodiment, connector 50A is attached at the end of the extension member 46 on leg 42A of the cross-sectional frame member 34. In one embodiment, connectors 50A, 50B, 50C have an enclosed shape that fits around chords 30A, 30B, 30C and may be fastened to the chords by welding or with suitable fasteners. However, any means to attach connectors 50A, 50B, 50C to the chords 30A, 30B, 30C may be used without departing from the scope of the invention.

Figure 4:
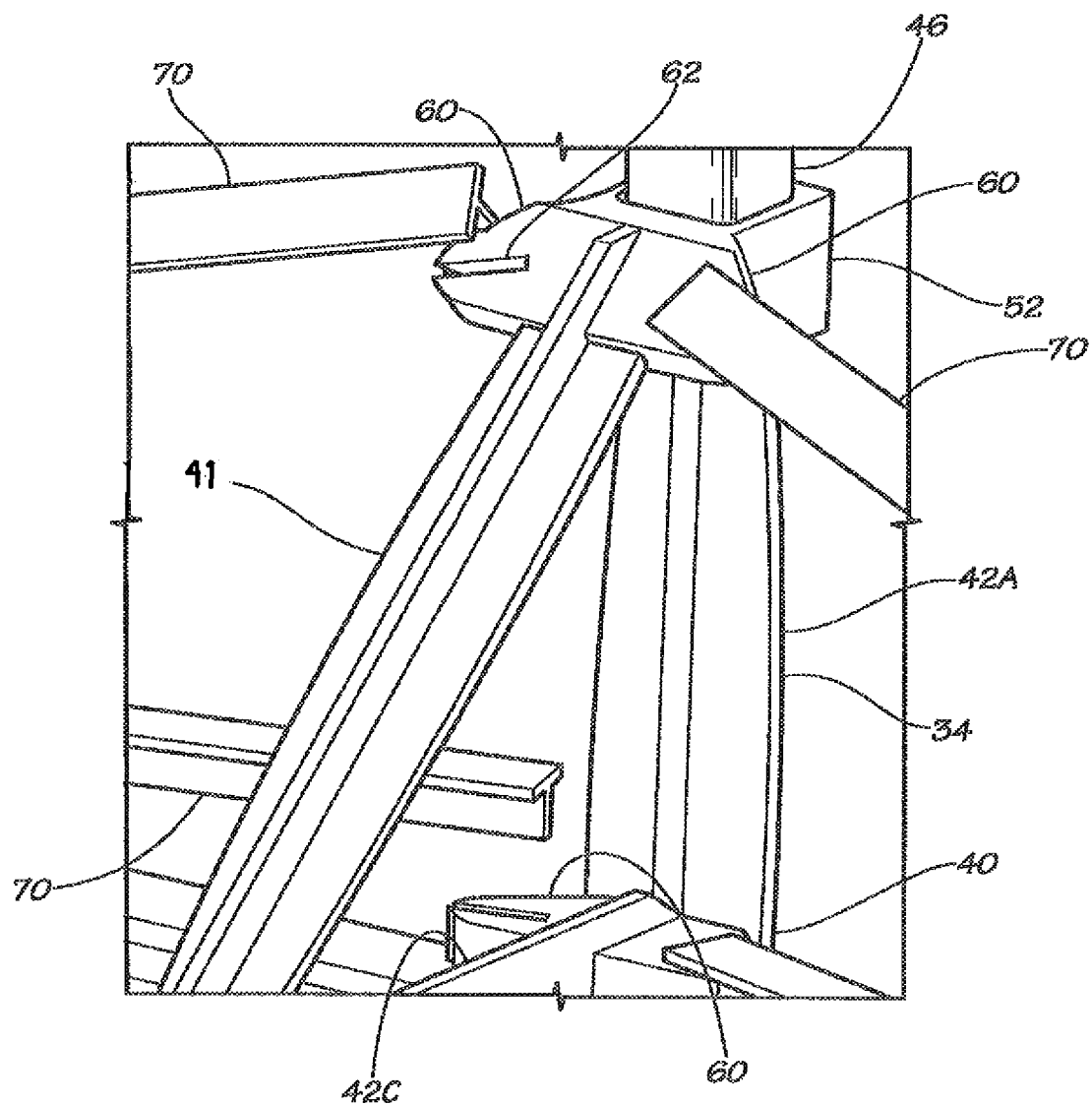
FIG. 4 is an exploded view of an embodiment of a joint of the boom arm of FIG. 2.

As best seen in FIGS. 3 and 4, the cross-sectional frame members 34 and the connectors 50A, 50B, 50C are cast or welded with brace-receiving portions 60 configured to receive tee-shaped brace members 70. The brace receiving portion 60 may be formed as a lobe, flange or other extension of the connectors 50A, 50B, 50C and cross-sectional frame member 34. In the illustrated embodiment, the cross-sectional frame members 34 have brace-receiving portions 60 extending from each side near the junction 40 of the three legs 42A, 42B, 42C and near the connectors 50A, 50B, 50C. The brace-receiving portions 60 may be formed by casting or by plate welding. Brace-receiving portions 60 have a slot 62 formed therein configured to receive tee-shaped brace members 70 as will be explained below.

Figure 5:
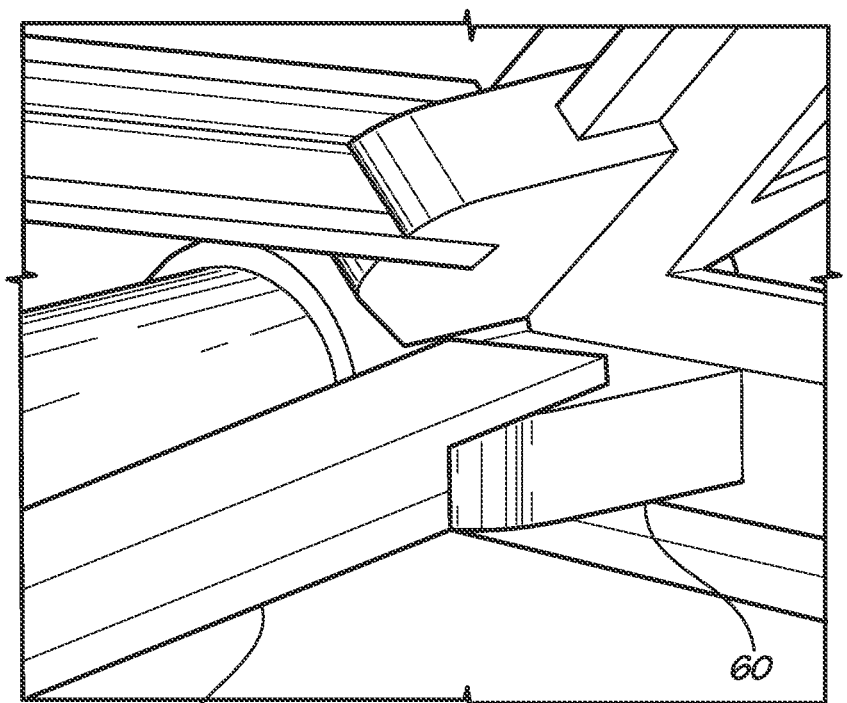
FIG. 5 is an enlarged perspective view of a joint of the boom arm of FIG. 2.

Tee-shaped brace member 70 is desirably extruded with a top flange 72 with a stem 74 extending therefrom to form the tee-shape. FIGS. 4 and 5 best show that the stem 74 of the tee-shaped brace member 70 fits into the slot 62 of the slotted brace-receiving portions 60. In the illustrated embodiment, the tee-shaped brace member 70 has a tee-shape along its entire length. However, one skilled in the art will understand that the tee-shape brace member 70 can have a tee-shape at its ends that join with the slotted receiving member 60 and have any other suitable shape at other points along its length.

Figure 6:
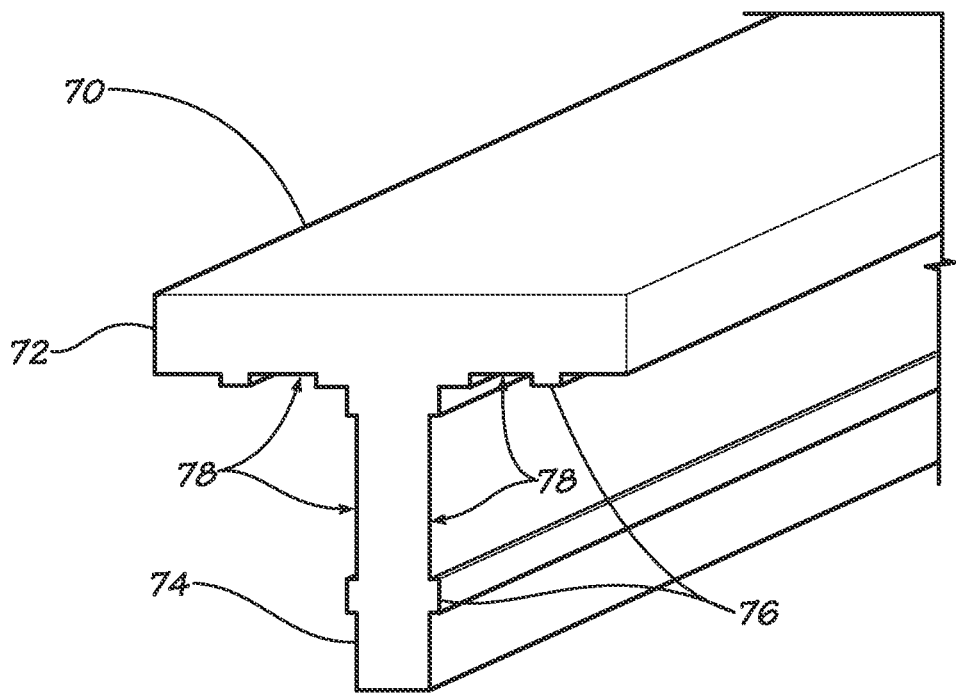
FIG. 6 is a perspective view of a portion of a tee-shaped bracing member of the boom arm of FIG. 2.

As best seen in FIG. 6, in one embodiment the underside of the top flange 72 and sides of the stem 74 desirably have offsets 76 that form channels 78 configured to receive an adhesive (not shown). Adhesive or bonding material such as epoxy resins, hot melt adhesives, or other customary permanent adhesives that will adhere or bond similar or non-similar materials together, may be applied in the channels 78. Desirably, the size of the offsets 76 depend on what type of adhesives are used. One skilled in the art will understand that these offsets 76 are optional to get as much strength out of a certain bonding area, but are not mandatory. With the offsets the strength of a joint is more predictable. Additionally, a spacing between tee-shaped brace member 70 and the slotted brace-receiving portion 60 could also be achieved by other means without departing from the scope of the invention such as with a plastic insert that keeps tee-shaped brace member 70 and the slotted brace-receiving portion 60 apart from each other. One suitable example adhesive is Scotch-Weld™ Epoxy Adhesive DP920 available from 3M™ of St. Paul, Minn. Alternatively, offsets 76 may be formed in the inner and outer surfaces of the slotted receiving portion 60 that are adjacent the installed tee-shaped brace member 70 without departing from the scope of the invention and the adhesive or bonding material may be applied to these channels. For this adhesive, it has been determined that a height of between about 0.3 and 0.5 mm for the offsets 76 provides suitable channels 78 for the adhesive. Other heights, such as between about 0.2 and 1.0 mm may also be suitable for other adhesives. Because the joint is bonded by adhesives, the material for the tee-shaped brace member 70 and the brace-receiving portion 60 may be made from different material. The tee-shaped brace member 70 and the brace-receiving portion 60 may be made from aluminum or any other suitable material used in lattice-type structures. One skilled in the art will understand that offsets 76 may be used with all receiving pockets and structural parts in the boom arm 20 to form adhesive holding pockets such that the entire structure may be adhesively bonded. Other ways to create a distance between the surfaces such as tight positioning control, plastic insert may be used without departing from the scope of the invention. Additionally, in some instances no offsets may be necessary.

Figure 7:
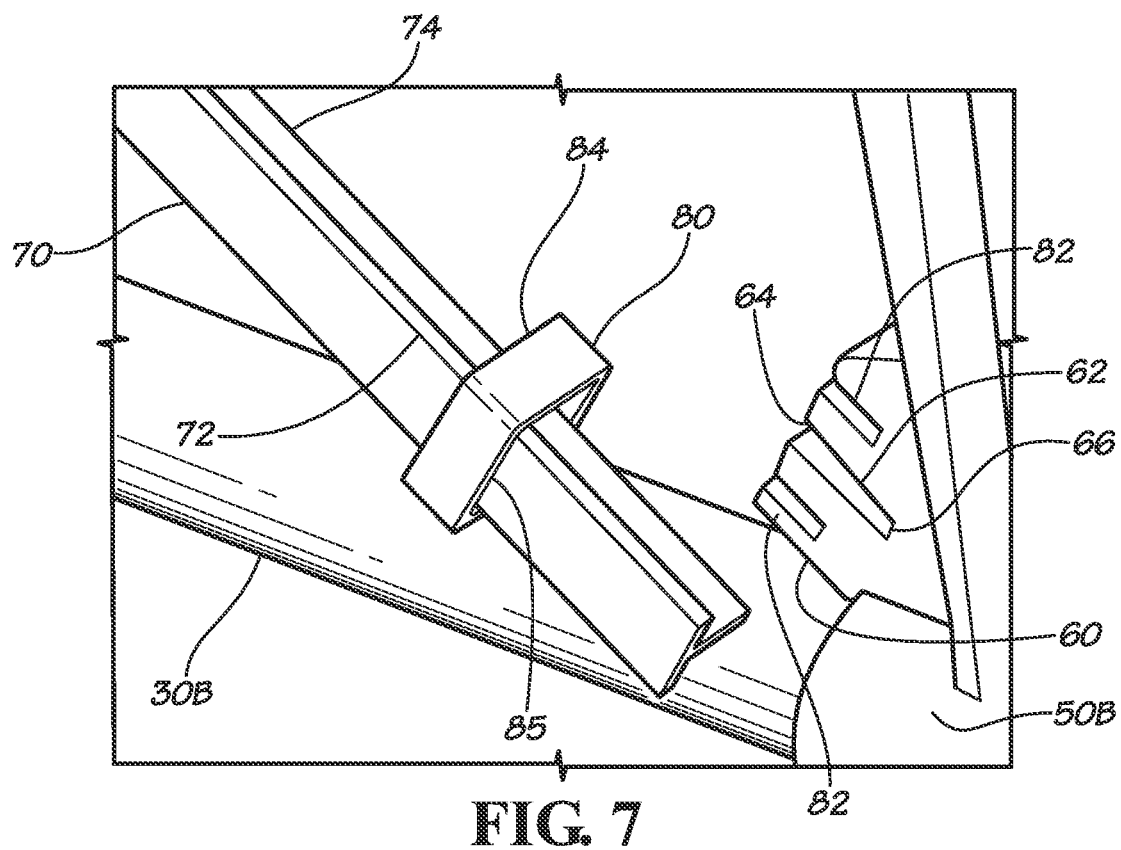
FIG. 7 is a partially exploded perspective view of another embodiment of a joint of the boom arm of FIG. 2.
Figure 8:
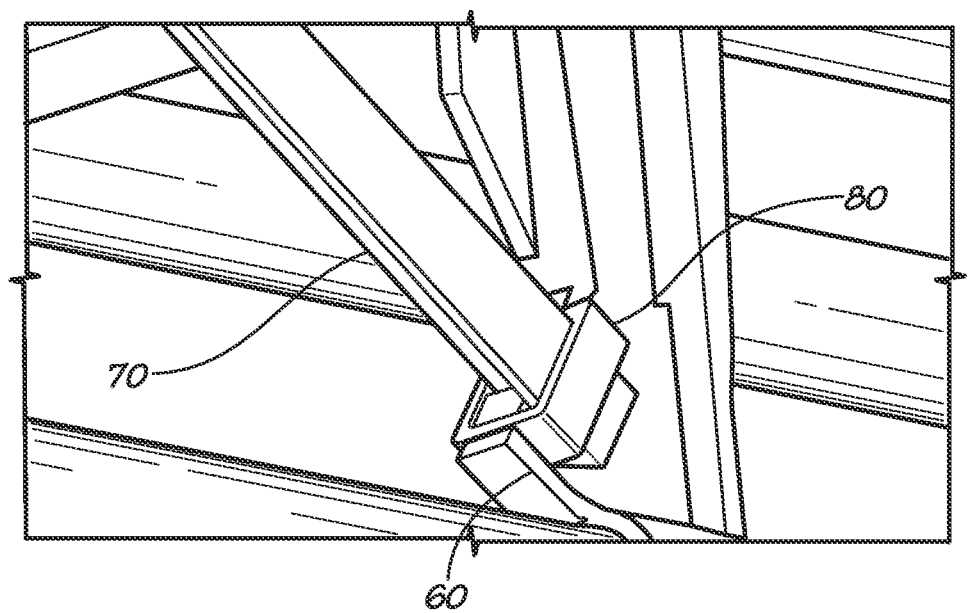
FIG. 8 is a perspective view of the joint of FIG. 7.

Turning now to FIGS. 7 and 8, in one embodiment the slotted receiving member 60 has a slot 62 with a v-shape. As best seen in FIG. 7, the mouth 64 of the slot 62 has a larger width than the distal end 66 of the slot 62. In some situations, such as with some brace members 70 in a tapered boom arm 20, it is desirably to have some flexibility in the angle that the brace member 70 extends from the receiving member 60. However, the adhesion between the stem 74 of the tee-shaped brace member 70 and the slotted receiving portion 60 is not optimal as forces applied by moving and twisting of the boom arm 20 may cause peel forces on the top flange 72 of the tee-shaped brace member 70. A locking collar 80 is used to lock the tee-shaped brace member 70 in the slot 60 and keep the top flange 72 of the tee-shaped brace member 70 flat against the slotted receiving portion 60. In the illustrated embodiment, the slotted receiving portion 60 has notches 82 on either side of the slot 62 and sides 84 of the collar 80 are received in the notches 82 to lock the tee-shaped member 70 in the slot 62. Top portion 85 of the locking collar 80 presses against the top flange 72 of the tee-shaped brace member to keep the stem 74 in the slot 62. Locking collar 80 may be adhesively bonded, and therefore may require offsets in the notches 82 of the slotted receiving portion 60 as well to hold the adhesive. Construction of the boom arm 20 is facilitated as the joints can be successively assembled. In a three dimensional lattice structure held together by adhesives, it can be difficult to mount everything because of inserts that require room to slide into another part. Furthermore, the cut length of a part often determines the distance between two joints. With the tee-shape brace member and slotted receiving portion, it is possible to connect two structural joints by adhesive bonding in a part as if welding the two components.

An advantage of the boom arm 20 design illustrated herein is it is possible to use different materials throughout the boom arm 20. Exotic or common materials can be used, depending on demand and requirements. The wall thickness of material can be varied depending on local stresses throughout the structure, depending on plumbing and durability requirements. Thin wall stock or custom material can be used where welding would be difficult or detrimental to the properties of the material. Where high strength materials become available and welding would be more difficult, lighter boom arms 20 may be constructing as shown herein. It is believed that durability of the boom arm is improved because of the reduced number of weld spots at joints.

While this invention has been described in conjunction with the specific embodiments described above, it is evident that many alternatives, combinations, modifications and variations are apparent to those skilled in the art. Accordingly, the preferred embodiments of this invention, as set forth above are intended to be illustrative only, and not in a limiting sense. Various changes can be made without departing from the spirit and scope of this invention.

What is claimed is:

1. An adhesively bonded joint in a boom arm of an agricultural sprayer, the joint comprising:
    a tee-shaped brace member having a top flange and a stem extending from the top flange;
    a brace-receiving portion of a structural member of the boom arm, the brace-receiving portion having a slot receiving the stem of the tee-shaped brace member and a first notch on one side of the slot and a second notch on an opposite side of the slot, wherein the slot is v-shaped, with a mouth of the slot being wider than the width of a distal end of the slot, wherein sides of the stem and an underside of the top flange are adhesively bonded to facing surfaces of the brace-receiving portion; and
    a rectangular locking collar slidingly positioned around an end of the tee-shaped brace member, wherein opposite sides of the locking collar are received in the first and second notches in the brace-receiving portion on either side of the slot such that the interaction of the sides of the locking collar with the notches of the brace-receiving portion locks the stem of the tee-shaped brace member in the slot of the brace receiving portion.

2. The adhesively bonded joint in a boom arm of claim 1, wherein the tee-shaped brace member and the brace-receiving portion are made of dissimilar materials.

3. The adhesively bonded joint in a boom arm of claim 1, wherein the underside of the top flange and the sides of the stem have offsets extending between about 0.3 mm and 0.5 mm to form adhesive-holding channels.

* * * * *